Patented Mar. 4, 1952

2,587,954

UNITED STATES PATENT OFFICE 2,587,954

REFUSE PALM OIL REFINING

Vigen K. Babayan, West Englewood, N. J.

No Drawing. Application July 17, 1948,
Serial No. 39,370

7 Claims. (Cl. 260—424)

This invention concerns the refining of "refuse palm oil."

Refuse palm oil is a waste product of the steel industry where palm oil is used for the purpose of lubricating and assisting in the polishing of steel sheets. It is also used in tinplating processing. Fresh palm oil is used in huge quantities in the steel industry for the processing of steel and when the palm oil is spent, full of contaminants, and has lost its efficiency, it is discarded. This discarded material is abundant in contaminants. One will find much iron, tin, carbon, clay, dirt, unsaponifiables and metal salts of the palm oil fatty acids. It is a dark brown to black waxy solid with an unpleasant odor. It is this by-product of the steel industry, this discarded material, which is called refuse palm oil and it will be referred to as such throughout the present application.

The refuse palm oil despite its contaminants has valuable and useful components present. If one can separate the impurities from the palm oil and the palm oil fatty acids, one would have a useful product for industrial use for such purposes as soaps, candles, detergents, lubricants, etc. The present invention has as a primary object the provision of a process by which the refuse palm oil may be treated and the impurities separated from the palm oil and valuable products derived from the separation.

The invention broadly contemplates warming and filtering the refuse palm oil to eliminate sediments and then treating the filtered oil with a mineral acid, most advantageously phosphoric acid, in a manner to eliminate metallic impurities. The acid treated oil is then bleached and deodorized to yield a fatty oil-fatty acid mixture of good color and odor.

So far as I am aware, in the art of treating refuse palm oil, the only process which has been used to any extent is one which depends on distillation of sulfuric acid treated refuse oil. In this process the refuse palm oil is first treated with 60° Baumé $H_2SO_4$ to eliminate metallic impurities and sediments. It is then subjected to a splitting process (Twitchelling) in the presence of a splitting catalyst. The fatty acids thus obtained are now distilled to obtain a relatively pure material. Since distillation is a relatively expensive operation as compared with the treatment steps of the present invention, the present invention can obtain better results at lower process cost over the distillation techniques being employed. Other advantages are the facts that no expensive equipment is involved, yields are higher and the useful products obtained are more easily isolated.

Refuse palm oil as obtained from steel mill to steel mill or even from batch to batch from the same steel mill, vary in their composition of sediment, metal impurities, etc. The process of treatment must therefore be flexible enough to account for the variables. The present invention, being cognizant of the variation of the refuse oil and the contaminants involved, contemplates a process which within certain limits will account for the variations encountered.

In a brief description of the process we may illustrate with the following illustrative example: 200 parts of refuse palm oil (containing tin), which had been warmed to 70° C. and filtered through a fine shaker screen, was added to a mixture of 800 grams of water containing 10 grams of 85% $H_3PO_4$. The entire batch was agitated vigorously for 2 hours while the contents were kept at 70–90° C. The dark brown refuse oil lightened in color and became a light brown. An insoluble precipitate came out of solution and on standing the precipitate tended to settle to the bottom. The acid solution took on a light yellow-green color. The batch was now allowed to settle into layers. The insoluble precipitate at the bottom was filtered off, washed clear and set aside to dry. This was an insoluble tin phosphate which may be sold as such or may be converted to metallic tin and reused in the tinplating of steel. The amount of tin recovered as the precipitate constituted 5.3% of the starting material. The aqueous acid layer was then drained off, and the mineral acidity tested. (If sufficient free acid is present, the solution can be reused to process additional refuse oil. If the solution is no longer acid then additional acid should be added to the oil and agitated for an additional 2 hours. In any event, at the end of the agitation the aqueous solution should still be acid to Congo red.) The remaining oil layer was now washed thoroughly with hot water and steam until free of any occluded precipitate or mineral acidity. The oil was then allowed to settle overnight while it was kept at 70° C. At this temperature the oil is above its melting point, and fluid enough to allow complete settling to take place. If overnight settling is not practical, the hot oil may be treated with anhydrous $Na_2SO_4$ or Glauber salt to eliminate the water present to the extent that the amount of water present is less than 1% of the oil.

The treated refuse oil was now treated with 5 of activated carbon and 5% of diatomaceous earth for bleaching. (The amount of carbon black and clay will vary with the darkness of the oil being treated. Some batches will only require 1-2%, others as high as 5% and more. Usually 2-3% of each bleach ingredient is sufficient to bleach the treated refuse oil to the orange color of the original palm oil.)

The treated refuse oil was already warm and at about 70° C. The activated carbon and the diatomaceous earth were mixed together and added to the warm oil and the entire batch stirred for about half an hour while the temperature was maintained. The mixture was now pumped through a filter press which can separate the carbon black and the clay from the oil taking with it the dark color bodies and leaving a clear bleached oil which was collected as it came through the filter press.

If desired to subject the bleached oil to deodorization, then a vessel in which superheated steam can be made to bubble through the oil while it is under pressure will destroy and/or eliminate any odorous constituents which may remain in the oil. If one has a vacuum bleacher the two operations can be done at the same time.

The oil obtained from the treatment was of straw yellow color and constituted 83.5% of the starting material. It was a mixture of palm oil fatty acids and palm oil (glyceride).

The bleached and/or deodorized oil was now pumped to storage and may be used as needed. If the end use is for lubricants and certain other purposes, deodorization need not be considered but if the end use is for soaps, cosmetics and such uses it is advisable to include deodorization. The amount of bleaching may also be varied to obtain a product suitable for the end use contemplated. If the initial treatment is carried out with care the bleaching may be carried on to a point where practically a colorless end product is obtained.

If it is desired to secure a superior product which may be used without any reservations for various industrial uses, then it is preferable to carry out the treatments in the presence of a solvent. The initial refuse oil is then dissolved in 2 to 4 times its weight of a solvent, such as an aliphatic petroleum solvent, for instance mineral spirits or hexane. The diluted solution is now filtered through fine shaker screens or filter beds of clay or any of the fine filter setups able to take out suspended sediments and insoluble matter. The filtered solution is now subjected to a hot, dilute aqueous $H_3PO_4$ wash, such as described in the first example. The treatment is the same but since the oil is diluted with a solvent the treatment brings about still greater improvements, especially with respect to color and odor. After the bleach and deodorizing treatments, the solvent is evaporated off leaving the refined oil as a white solid when cooled to room temperature. The solvent process gives an exceptionally fine product and makes the handling easier but it does involve the added cost of a solvent recovery system. The underlying principle and the refining process is the same but the ease of handling and the achieved results favor the solvent process whereas the process cost and investment of capital favor the non-solvent treatment.

If the refuse palm oil being treated is tinpot oil and rich in its tin content, then $H_3PO_4$ is the only mineral acid which should be considered. If, however, the refuse oil is one devoid of tin or having only traces of tin, then the tin recovery is not an important factor and acids such as $H_2SO_4$ and HCl may be used. When using $H_2SO_4$ or HCl, the metal impurities will then be eliminated as soluble sulphates or chlorides as the case may be. In all cases there is always an abundance of iron which is eliminated as the soluble salt whether it be the phosphate, sulphate or chloride.

The refined refuse oil obtained in any of the ways described above may be processed further by reacting the oil to make other derivatives, for instance sulfonating, phosphating, making the esters, amides, acid chlorides, etc. The refuse oil may be first Twitchelled to obtain the fatty acids and then subjected to the treatment of the present process in order to obtain an end product of only fatty acids.

In describing the invention in detail I may take the steps in order. The refuse palm oil may have substantial amounts of carbonaceous matter and insoluble sediments, clay, etc., present. Any filtration set-up which can adequately eliminate the suspended matter, fine or coarse, will serve the purpose here. The art is accustomed to the use of fine shaker screens which eliminate most of the suspended matter. Clay beds or oil filter presses may do a better job but their output is probably less than that of the shaker screens. Centrifuging can be practical if the amount of sediment does not run too high.

The acid treatment of the filtered refuse oil serves to eliminate the metallic impurities, and other soluble contaminants. The acid treatment must be given in such a form that it will not destroy the constitution of the oil nor will it darken the oil, but at the same time be able to dissolve the free metals present and split the metal soaps which were formed in the steel treatment. This can best be done by employing a dilute acid solution. Using 1-5% acid based on the weight of the oil diluted with water to a volume 100-400% that of the refuse oil, ensures the acid strength being low enough to prevent darkening and decomposition of the oil while still eliminating the metal impurities present. The use of such dilute acid solution is of great importance in the process of the invention. This dilution may be as high as 500% of water based on the weight of oil, although in some cases the water percentage may be somewhat lower than 100%, for instance down to 50%.

Since tin may be one of the metal impurities and can be reused if recoverable, the invention takes into account the method by which the tin present can be precipitated out and separated from the other metal contaminants. The solubility of tin phosphate in water or dilute phosphoric acid is negligible while that of iron phosphate is high. By using phosphoric acid as the acid for the treatment the present invention can accomplish several desirable objectives in one step. The use of phosphoric acid not only eliminates the metal impurities from the refuse oil but at the same time allows the tin present to precipitate out as the insoluble tin phosphate while the iron phosphate which is soluble remains in solution. The insoluble tin phosphate may be filtered off, washed free of mineral acidity or oil and then dried and sold as tin phosphate or ignited to release the phosphate leaving behind metallic tin. The recovered tin phosphate or the tin may be sold or used again for further processing of steel. If the recovery of tin is not to be considered, but just the elimination of metal impurities, then dilute $H_2SO_4$ is to be preferred since $H_2SO_4$ can be cheaper to use than $H_3PO_4$. In this case 1–5% of $H_2SO_4$ based on the weight of refuse oil is used with again 100–400% of water based on the weight of the oil and the treatment steps repeated. In this case, however, the metal impurities as the sulfates are all sufficiently soluble to remain in solution.

The treatment temperature may vary somewhat. From room temperature to the boiling point of water and higher can be considered and successfully used. When working with a solvent, room temperature to 60° C. is preferred. When working without a solvent, better results are obtained if the oil is fluid enough to become thoroughly mixed and washed. Temperatures from 40° C.–100° C. would then be the preferred range of operation.

Following the acid treatment, the refuse oil is washed with hot water or steam until completely free of mineral acidity and/or occluded precipitate. When this has been accomplished (1–4 washes may be needed, depending on the adequacy of the equipment for thorough mixing and separating) the treated oil is allowed to settle to eliminate the water or is treated with Glauber salt or some similar agent to ensure reduction of moisture content of the treated oil down to 1% or less. Overnight settling can bring about the same result providing the oil is kept warm and liquid, for example, at 70° C. The small amount of moisture left in the oil after overnight settling can be used to good advantage in the decolorizing step which follows.

It is desirable to have about 0.5% moisture in the treated oil when the oil is being subjected to the bleaching operation since the adsorption of the color bodies on the carbon and clay appears to take place with greater ease. Depending upon the darkness of the treated oil bleaching agents from 0.5–5% and even more may be used to obtain the desired bleaching effect. Acid treated bentonite along with activated carbon seems to give the best results but other clays and filter acids may be used in place of the bentonite to obtain adequate bleaching action. Under the desirable conditions the bleaching agents are added to the treated oil and the batch treated in a vacuum bleacher from ½–2 hours. Then the treated oil is passed through filter presses to eliminate the bleaching agents and leave the bleached oil ready for storage or shipping. If a vacuum bleacher is not available then the bleaching agents and the oil are mixed together at 70–80° C. and agitated for ½–2 hours and filtered through the filter presses as described above. Other methods of bleaching may be used if desired such as the use of peroxides or chlorites, etc., but that is optional since the oil after the acid treatment has become receptive to the various bleaching techniques.

In the above described process if one wishes to use solvent the process becomes easier to handle and the resulting product is superior. Usually the initial cost of installing a solvent recovery system is too great to warrant its use, since adequate results can be secured in the non-solvent procedure. I do not wish to limit my invention to the non-solvent procedure, however, since I have found that the process does lend itself to the use of solvents with even better results than the non-solvent procedure. In the following examples I shall illustrate both procedures and compare the resulting products. Parts are given by weight unless otherwise indicated.

*Comparative Examples 1–4*

In the following series of experiments all the conditions except the amount of acid used were the same.

In each case 100 parts of refuse oil was added to 400 parts of water containing the appropriate amount of $H_3PO_4$ (85%) and the whole batch agitated vigorously for 2 hours while the mixture was kept at 70–80° C.

In the several examples the amount of $H_3PO_4$ was as indicated just below.

| Ex. # | Amount of $H_3PO_4$ |
|---|---|
| 1 | 2 parts/100 parts of refuse oil. |
| 2 | 5 parts/100 parts of refuse oil. |
| 3 | 10 parts/100 parts of refuse oil. |
| 4 | 15 parts/100 parts of refuse oil. |

After the acid treatment each batch was allowed to settle. The dark brown to black refuse oil had changed to a yellow-orange oil in each case. An insoluble precipitate had come out of solution and settled at the bottom. The precipitate and the aqueous layer were drawn off and the oil layer washed thoroughly with hot water until neutral. The oil was then mixed with Glauber salts (10 parts) and allowed to stand for 1 hour at 70° C. The oil was decanted off and treated with 2% activated carbon and 2% acid treated bentonite for 1 hour at 70° C. It was then filtered clear of the bleach ingredients to obtain an orange red oil. The product of Example 1 was darker than the others but the rest appeared to have the same color. Evidently excess acid is not an advantage but having too little acid may leave some metallic impurities in the oil. When the product of Example 1 was retreated with an additional 2 parts of $H_3PO_4$ the color of the product improved and became even better than those of the previous runs.

*Example 5*

In another experiment 500 parts of filtered refuse oil was added to a solution of 2500 parts of water containing 50 parts of concentrated $H_2SO_4$. The entire batch was agitated for 1 hour while the temperature was kept between 60–80° C. After the agitation the mixture was allowed to settle. Two layers formed. An upper oil layer which was an amber oil and a bottom aqueous layer which was of a yellow-green color.

The layers were separated and the oil layer washed with hot water until free of mineral acidity. The aqueous layer was discarded. The neutral oil layer was mixed with 10 parts of anhydrous $Na_2SO_4$ to eliminate the water present and kept at 70–80° C. while 15 parts of activated carbon and 15 parts of bentonite were added and mixed thoroughly for ½ hour. The batch was now filtered through a fine Buckner funnel until the resulting oil came through clear, light orange in color. 400 parts of clear oil was recovered or a yield of 80% based on the weight of the starting refuse oil.

The above experiment illustrates the treating of refuse oil where H₂SO₄ is used as the refining acid. In the above example tin recovery was not a problem since the refuse oil being treated was almost devoid of tin. The metallic impurities were almost entirely iron, which was eliminated as the soluble iron sulfate.

*Example 6*

In still another experiment 300 grams of filtered refuse palm oil was treated with 1000 grams of water containing 12 grams of hydrochloric acid dissolved therein. The batch was agitated for 2 hours while the batch was maintained at 75° C. The batch was then allowed to settle into layers. The aqueous layer was drawn off and the oil layer subjected to live steam agitation for 1 hour. Then boiling water was allowed to sprinkle over the oil and gradually settle to the bottom. The aqueous layer was drawn off and the oil layer now subjected to a bleaching treatment with 2% activated carbon, 4% diatomaceous earth and 1% of 100 volume hydrogen peroxide. The resulting oil was straw yellow in color and gave a yield of 78% based on the starting material.

In subjecting the refuse palm oil to the dilute acid treatment it is well to remember that although the acid is about 5% based on the weight of the oil being treated, the concentration of the solution is diluted to under 2% of acid, by the addition of water. This dilution is important to prevent the splitting of any glycerides into the corresponding fatty acid and glycerine. The acid solution is able to split the metallic salts, however, to yield palm oil fatty acids and the metal. Depending upon the amount of metallic salts present in the refuse oil being treated, the resulting product will show a free fatty acid content equivalent to that liberated from the metallic salts present. In some extreme cases of spent palm oil the amount of fatty acids formed is as high as 50–60% of the starting material. Generally, however, the fatty acid content will be about 15–30% of the oil. At these proportions one can easily add additional glycerine to the refined refuse oil and re-esterify the free fatty acids to obtain a palm oil of low free fatty acid content which product can again be used for steel processing and uses similar to those for which fresh palm oil is used. One may also alkali refine this oil and eliminate the free fatty acids as soap stock leaving behind a neutral oil free of any other components.

*Example 7*

A series of experiments were run on the refuse palm oil but in these experiments the treatment was carried out in solvent solution. The refuse palm oil was added to an aliphatic hydrocarbon solvent (naphtha) to make a 25% solution of the oil in solvent. A batch of 400 parts of this solution was then agitated with an equal amount of 3% H₃PO₄ solution (400 parts water having 12 g. of H₃PO₄). The agitation was allowed to go on for 1 hour and then allowed the layers to separate. The temperature was kept at room temperature and no heating was used. The water layer and the insoluble precipitate which formed were drawn off and the solvent layer washed thoroughly with water until neutral (3 washes of 200 ml. were used). The insoluble precipitate when washed and dried was found to weigh 7.8 grams.

The solvent solution was now divided into 3 equal portions. One portion was treated with 1 gram of activated carbon and 1 gram of diatomaceous earth at the boiling point of the solvent and then filtered, the solvent evaporated off and the palm oil recovered. The resulting product was a pale yellow oil which on cooling solidified to a creamy white solid.

A second portion was passed through a column 20 cm. long and of 1″ diameter packed with a clay of the silicate type. The solution was kept warm and passed through twice and finally washed out the column with an additional amount of hot solvent (100 ml. of hot naphtha used). The resulting oil bleached to an orange on the first passage through the column and became a pale yellow on the second passage.

The third portion of the solvent solution was passed through a column as in the previous portion with the difference that the column was packed with an ion-exchange resin of the Amberlite type. The solvent solution was passed through twice and finally the column washed with hot solvent to remove any remaining oil. The resulting oil was a deep orange colored oil after the first passage and a light orange oil after the second passage.

The color referred to in the examples above is for the final product free of solvent. These oils solidify on cooling, taking on a lighter color when cold.

Still another experiment was run, the same as that described above but instead of phosphoric acid, sulphuric acid was used. The results were similar to that obtained with phosphoric acid, but the phosphoric samples had a slightly better color.

Any of the standard bleaching techniques or bleach ingredients may be used on the refuse palm oil after the refuse oil has been subjected to the acid refining technique described above. It is important, however, that thorough separation of the impurities be effected prior to the bleaching treatment.

I claim:

1. A method for refining refuse palm oil which method comprises treating the refuse palm oil with from 1% to 5% by weight of the oil of an acid selected from the group consisting of phosphoric acid, sulfuric acid, and hydrochloric acid at a temperature of from 0° C. to 100° C., the treatment being effected in the presence of water in an amount at least equal to 50% of the weight of the oil being treated, allowing the batch to stratify and separating the oil layer from the aqueous layer, and thereafter bleaching the oil.

2. A method according to claim 1 in which the acid employed is phosphoric acid.

3. A method according to claim 1 in which the acid employed is sulfuric acid.

4. A method according to claim 1 in which the quantity of acid used is from 2% to 3% by weight of the oil being treated.

5. A method according to claim 1 in which the acid treated oil is washed by subjecting it to treatment with hot water or with steam prior to the bleaching treatment.

6. A method for refining tin-containing refuse palm oil, which method comprises treating the refuse palm oil with an aqueous solution of phosphoric acid containing from 1% to 5% phosphoric acid by weight of the oil being treated and containing upwards of 50% water by weight of the oil being treated, allowing the batch to stratify, filtering the tin phosphate from the aqueous layer, and bleaching the oil layer.

7. A method for refining refuse palm oil which method comprises treating the oil with from 1% to 5% by weight of the oil of an acid selected from the class consisting of $H_3PO_4$, $H_2SO_4$ and HCl in the presence of from 50% to 500% of water based on the weight of the oil and at a temperature of from 0° C. to 100° C., allowing the batch to stratify and separating the oil layer from the aqueous layer, and thereafter bleaching the oil.

VIGEN K. BABAYAN.

REFERENCES CITED

The following references are of record in the file of this patent:

UNITED STATES PATENTS

| Number | Name | Date |
|---|---|---|
| 322,425 | Cromwell et al. | July 21, 1885 |
| 347,345 | Hall | Aug. 17, 1886 |
| 1,973,790 | Appleton | Sept. 18, 1934 |

FOREIGN PATENTS

| Number | Country | Date |
|---|---|---|
| 377,336 | Great Britain | July 28, 1932 |